United States Patent [19]
Flanders

[11] Patent Number: 6,104,298
[45] Date of Patent: Aug. 15, 2000

[54] ROOF MOISTURE DETECTION ASSEMBLY

[75] Inventor: Stephen Nathaniel Flanders, Norwich, Vt.

[73] Assignee: The United States of America as represented by the Secretary of the Army, Washington, D.C.

[21] Appl. No.: 09/418,492

[22] Filed: Oct. 15, 1999

[51] Int. Cl.[7] .................................................. G08B 21/00
[52] U.S. Cl. ........................ 340/602; 340/601; 340/604; 340/605; 340/539; 340/556
[58] Field of Search ..................... 340/601, 602, 340/604, 605, 539, 556, 696; 73/40, 40.5 R; 324/533, 532, 557; 364/556, 696; 382/100, 104

[56] References Cited

U.S. PATENT DOCUMENTS

| | | | |
|---|---|---|---|
| 3,789,296 | 1/1974 | Caruso | 324/643 |
| 4,598,273 | 7/1986 | Bryan, Jr. | 340/539 |
| 4,965,554 | 10/1990 | Darling | 340/604 |
| 5,193,390 | 3/1993 | Nill, Jr. | 73/335.02 |
| 5,459,403 | 10/1995 | Kohler et al. | 324/643 |
| 5,463,377 | 10/1995 | Kronberg | 340/605 |
| 5,560,712 | 10/1996 | Kleinerman | 374/161 |
| 5,774,569 | 6/1998 | Waldenmaier | 382/100 |
| 5,818,340 | 10/1998 | Yankielun et al. | 340/602 |
| 5,818,951 | 10/1998 | Schivley | 382/100 |
| 5,877,969 | 3/1999 | Gerber | 364/562 |
| 5,886,636 | 3/1999 | Toomey | 340/602 |

*Primary Examiner*—Jeffrey A. Hofsass
*Assistant Examiner*—Hung Nguyen
*Attorney, Agent, or Firm*—Luther A. Marsh

[57] ABSTRACT

A roof moisture detection assembly includes an imaging system for obtaining thermal and visible images of a roof surface, an imaging system support structure for mounting the imaging system in a position elevated relative to the roof surface, a reference target mounted on the roof surface, and an image-processing system adapted to compare current thermal and visible images of the roof surface with previous thermal and visible images of the roof surface and detect shapes and areas of anomalous features, and to compare the current thermal and visible images with each other and detect shapes and areas of anomalous features.

7 Claims, 2 Drawing Sheets

ROOF MOISTURE DETECTION ASSEMBLY

BACKGROUND OF THE INVENTION

1. Field of the Invention

The invention relates to detection and monitoring systems and is directed more particularly to an assembly for detecting and monitoring the presence of moisture within a system of roofing materials and distinguishing it from the presence of moisture on a roof top surface.

2. Description of the Prior Art

Attempts to detect and monitor the presence of moisture in roofing systems have included monitoring by infrared imaging, and, alternatively, by visual images. Unfortunately, such measures are limited by the possible findings of false negatives, i.e., the presence of moisture when none is indicated, or false positives, i.e., indications of moisture when none is present. To improve the accuracy of such non-invasive monitoring, infrared surveys are often carried out during times of high thermal contrast, such as on cold nights. Traditionally, infrared surveys require visits to the roof at night. Monitoring visual images has required daytime visual inspections.

Visit to roof-tops, particularly when carrying heavy equipment, and particularly on cold nights, involves some risks from a safety standpoint.

Other known types of roof moisture detection, such as through capacitance measuring techniques, and nuclear resonance techniques, require substantial labor inputs to mobilize the survey and to interpret the results.

There is thus a need for a roof-top moisture detection assembly which provides continuous coverage for long terms, facilitates early detection with improved and acceptable reliability and accuracy, and requires limited labor input.

SUMMARY OF THE INVENTION

Accordingly, an object of the present invention is to provide a detection assembly which facilitates long term continuous coverage, with minimal labor, and with accurate and reliable early detection capabilities.

A further object of the invention is to provide such an assembly which achieves the aforementioned objects by means of time-series image processing of both visible images and infrared images substantially simultaneously.

With the above and other objects in view, as will hereinafter appear, a feature of the present invention is the provision of a roof moisture detection assembly comprising an imaging system for obtaining thermal and visible images of a roof surface, an imaging system support structure for mounting the imaging system in a position elevated relative to the roof surface, and a reference target mounted on the roof surface. An image-processing system is adapted to compare current thermal and visible images of the roof surface with previous thermal and visible images of the roof surface and detect shapes and areas of anomalous features, and to compare the current thermal and visible images with each other and detect shapes and areas of anomalous features.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings:

FIGS. 3A–6A and 3B–6B are illustrative of displays of infrared and visible images in use of the assembly of FIGS. 1 and 2.

DESCRIPTION OF THE PREFERRED EMBODIMENT

Figure 1:
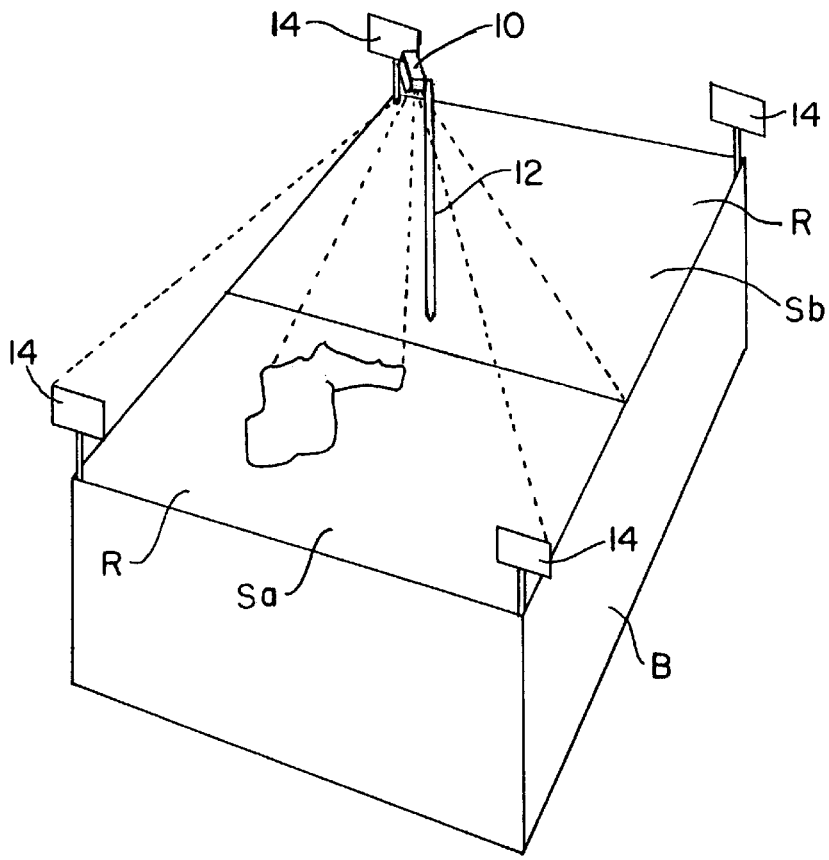
FIG. 1 is a perspective and diagrammatic view of a roof-top portion of a roof moisture detection assembly illustrative of an embodiment of the invention.
Figure 2:
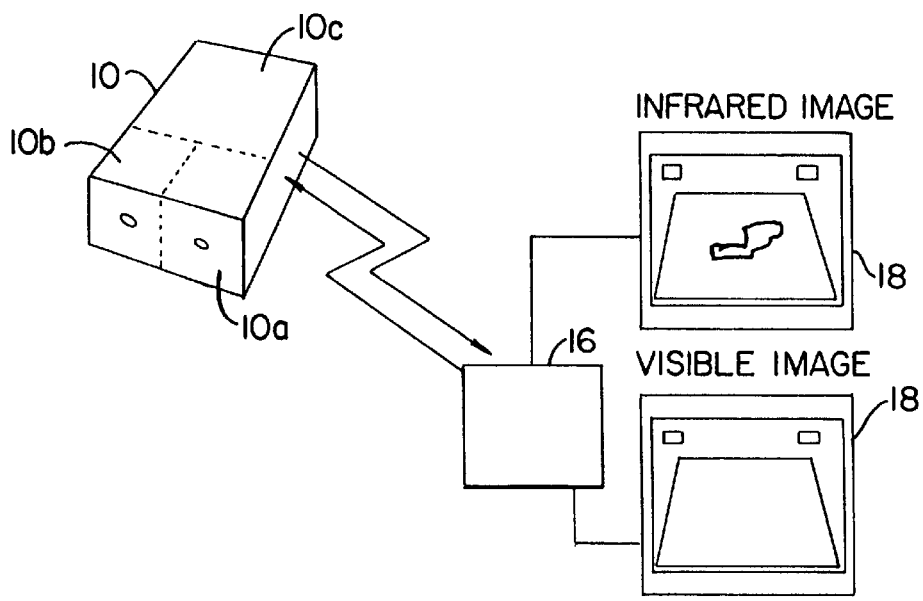
FIG. 2 is a diagrammatic view of a portion of the roof moisture detection assembly remote from the roof-top and further illustrative of the aforementioned embodiment of the invention.

Referring to FIGS. 1 and 2, it will be seen that the illustrative assembly includes an imaging system 10 which provides digital output from an infrared imager portion 10a thereof and a visible-spectrum camera portion 10b thereof.

The imaging system 10 is mounted on a mast 12 (FIG. 1), or other support structure, for retaining the imaging system 10 in an elevated position relative to a roof surface R of a building, or other structure, B. The mast 12 may be mounted on the structure B, or in proximity thereto, such that the imaging system is provided with an unobstructed overview of the roof surface R.

The imaging system 10 may include timer and movement elements (not shown) for periodically moving the imaging system from a position having a field of view of one sector Sa of the roof surface R to one or more additional positions, each having a field of view of another sector Sb of the roof surface R.

Each sector Sa, Sb of the roof surface R is provided with at least one reference target 14 fixed therein. The reference target 14 may comprise an upstanding pole and/or a geometric plate, as shown in FIG. 1. The targets 14 provide means for registering one image with another and provide a reference emissivity.

Referring to FIG. 2, it will be seen that the imaging system 10 further includes a signal transmission portion 10c, preferably wireless, for transmitting data to an image processing system 16, which is at a remote location relative to the roof surface R, and may be at a remote location relative to the building B. The imaging processing system 16 includes means for receiving data from the imaging system 10 and further includes software for interpreting and comparing images over time. The image processing system 16 may include displays 18a and 18b showing infrared generated images and visible-spectrum camera images, as shown in FIGS. 2 and 3A–6B.

It will be apparent that the imaging system 10 and image processing system 16 may be provided with hardwire data transmission and receiving means. Further, the image processing system 16 may be provided with wireless or other means for transmitting signals to the imaging system 10 for modifying times spent in particular roof sectors, angles of view, exposures, and the like.

The assembly observes the changes in infrared and visible images of a flat or low-slope, insulated, membrane roof over time. The assembly automatically determines whether a change in image is due to a subsurface thermal anomaly. Such may be attributable to moisture beneath the roof membrane, or to a surface feature, such as a puddle. The assembly can be adapted to automatically alert an operator responsible for the integrity of the roof surface.

In operation, the imaging system 10 systematically and automatically obtains thermal and visual images of every sector of the roof accessible from the vantage point of the imaging system. Each sector of the roof is provided with the reference targets which the imaging system locates in substantially the same location in the image each time the imaging system is aimed at that sector. The imaging system timer and movement elements move the imaging system infrared imaging position and visible spectrum camera portion serially so as to change the field of view from roof top sector to sector, such that images of the same sector are produced sequentially and spaced by a selected time. Images are obtained periodically. With each image obtained, the signal transmission portion 10c of the imaging system 10 transmits data on a generally continuous basis to the image processing system 16.

The image processing system 16 receives data from the imaging system 10 and normalizes the light levels and thermal conditions. The image processing system 16 compares the current thermal and visible images with previous thermal and visual images and identifies shapes and areas of anomalous features. The image processing system 16 further compares current thermal and visible images with each other and identifies anomalous shapes and areas of features indicated by both types of images.

As noted above, the images may be presented in visual display 18a and 18b, as shown in FIG. 2 and FIGS. 3A–6B. Alternatively, or in addition to display 18, the identification of a troublesome feature may be indicated by way of an audio or visual alarm or signal, making known the fact that a problem may be developing.

Figure 3A:
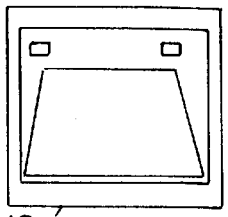
Figure 4A:
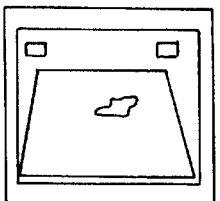
Figure 5A:
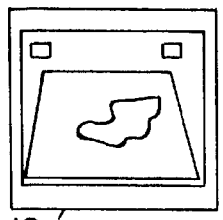

In FIGS. 3A–6B there is illustrated a series of displays illustrative of the types of images which may be produced by the image processing system 16. In FIGS. 3A and 3B, it is seen that for a given roof-top sector at a given time both the infrared (FIG. 3A) and visible (FIG. 3B) images indicate no problem. A selected time later, shown in FIGS. 4A and 4B, the infrared image (FIG. 4A) shows an indication of moisture, while the visible image (FIG. 4B) still fails to detect a problem. A further selected time later, shown in FIGS. 5A and 5B, the infrared image (FIG. 5A) indicates that the area of moisture presence is enlarging, while the visible image still fails to reveal a problem. The infrared images illustrated in FIGS. 4A and 5A reveal development of a subsurface anomaly over time, probably attributable to a growing area of moisture beneath the roof membrane, such as may be caused by a leak in or beneath the membrane.

Figure 6A:
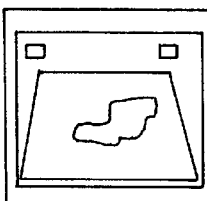
Figure 3B:
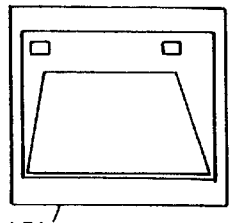
Figure 4B:
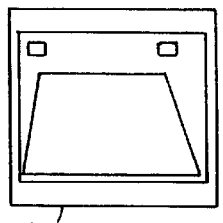
Figure 5B:
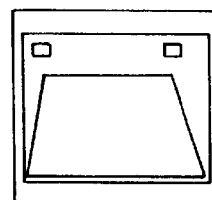
Figure 6B:
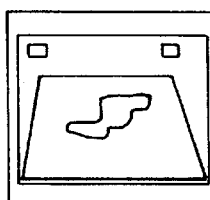

In FIGS. 6A and 6B, there is illustrated the appearance of a puddle on the roof surface, showing up as a thermal anomaly (FIG. 6A) and as a visible feature (FIG. 6B), clearly indicating the presence of a puddle on the roof.

Images appearing in other sequences would also have significance, as follows: formation of a puddle on the roof (FIGS. 3A and 3B would become 6A and 6B), the disappearance of the puddle from the roof top, (FIGS. 6A and 6B, would become FIGS. 3A and 3B), and the continued appearance of a thermal anomaly after disappearance of the puddle, (FIGS. 6A and 6B become 5A and 5B), denoting leakage from the puddle into the roofing system. Such could be indicative of a tear or puncture in the roof membrane which allows a roof-top puddle to leak beneath the membrane.

There is thus provided a roof-top moisture detection and monitoring assembly which provides generally continuous coverage for long terms, facilitates early detection with improved accuracy and reliability, and requires very limited labor input.

It will be understood that many additional changes in the details, materials, steps and arrangement of parts, which have been herein described and illustrated in order to explain the nature of the invention, may be made by those skilled in the art within the principles and scope of the invention as expressed in the appended claims.

What is claimed is:

1. A roof moisture detection assembly comprising:

an imaging system for continuously surveying a roof surface and intermittently obtaining discrete thermal and visible images of roof surface sectors and moisture therein and thereon;

an imaging system support mast for mounting said imaging system in a position elevated relative to the roof surface;

a reference target mounted on the roof surface; and an image-processing system adapted to compare current thermal and visible images of the roof surface, respectively, with previous thermal and visible images of the roof surface and detect shapes and areas of moisture-induced anomalous features, and to compare the current discrete thermal and visible images with each other and detect shapes and areas of moisture induced anomalous features;

to provide a continuous and intermittent visual indication of the presence of moisture beneath the roof surface and moisture on the roof surface, whereby to provide for moisture detection.

2. The assembly in accordance with claim 1 wherein said imaging system is adapted to move periodically from one of the sectors to another and to repeat a cycle of such movements, and comprises an infrared imager for obtaining the discrete intermittent thermal images and visible-spectrum camera for obtaining the discrete intermittent visible images.

3. The assembly in accordance with claim 2 wherein said support mast upstands from the roof surface.

4. The assembly in accordance with claim 2 wherein said reference target comprises at least one structure fixed proximate the roof surface and within a field of view of said imaging system, said reference target exhibiting a known reference emissivity.

5. The assembly in accordance with claim 2 wherein said imaging system further comprises a signal transmission portion for transmitting data from said imaging system to said image-processing system, said image-processing system being adapted to receive, interpret and compare the thermal and visible images.

6. The assembly in accordance with claim 4 wherein the roof surface comprises a plurality of sectors and each sector is provided with at least one of said reference targets.

7. The assembly in accordance with claim 5 wherein said signal transmission portion of said imaging system comprises a wireless transmission device.

* * * * *